United States Patent [19]

Schrammel et al.

[11] 3,951,388

[45] Apr. 20, 1976

[54] APPARATUS FOR CONTROLLING THE OPERATION OF INJECTION MOLDING MACHINES

[75] Inventors: Werner Schrammel; Arno Stöhr, both of Emmendingen; Hans Birkhofer, Windenreute, all of Germany

[73] Assignee: Klöckner-Werke AG, Duisburg, Germany

[22] Filed: Apr. 18, 1975

[21] Appl. No.: 569,171

[30] Foreign Application Priority Data
Apr. 25, 1974 Germany............................ 2419975

[52] U.S. Cl................................... 259/191; 425/145
[51] Int. Cl.²........................................ B29B 1/06
[58] Field of Search............... 259/191, 192, 193, 9, 259/10, 97, 25, 26, 45, 46, 5, 6; 425/208, 209, 207, 147, 149, 144, 145, 146; 100/145, 147

[56] References Cited
UNITED STATES PATENTS

| 3,317,962 | 5/1967 | Morse | 259/191 |
|---|---|---|---|
| 3,693,946 | 9/1972 | Merritt | 259/191 |
| 3,728,053 | 4/1973 | Stillhard | 259/191 |
| 3,797,808 | 3/1974 | Peter | 259/191 |
| 3,822,057 | 7/1974 | Wheeler | 425/145 |
| 3,822,867 | 7/1974 | Evans | 425/144 |

*Primary Examiner*—Robert W. Jenkins
*Attorney, Agent, or Firm*—Michael J. Striker

[57] ABSTRACT

An injection molding machine wherein a screw rotates and reciprocates in a barrel to plasticize granular synthetic material and to expel plasticized material into a mold. The screw is reciprocated by the piston of a hydraulic cylinder one chamber of which is connected with the outlet of a first pressure relief valve which determines the pressures of fluid while the screw moves forwardly to expel plasticized material, and with the inlet of a second pressure relief valve which determines the pressure of fluid while the screw moves rearwardly during plastification of granular material. The pressure relief valves are controlled by a pressure selecting valve which, in turn, is controlled by a programming unit. The inlet of the first pressure relief valve is connected directly with a line for highly pressurized fluid, and the outlet of the second pressure relief valve is connected with the tank. A fluid flow regulating valve controls the flow of hydraulic fluid from the high pressure line to the control ports of the pressure relief valves and to one port of the pressure selecting valve. Another port of the latter valve is connected with the tank.

10 Claims, 2 Drawing Figures

APPARATUS FOR CONTROLLING THE OPERATION OF INJECTION MOLDING MACHINES

BACKGROUND OF THE INVENTION

The present invention relates to injection molding apparatus in general, and more particularly to improvements in apparatus for controlling the pressure of fluid medium which causes or allows the plasticizing screw to move lengthwise in the barrel of an injection molding machine.

It is known to employ in an injection molding machine a hydraulic cylinder wherein a piston moves back and forth under or against the action of oil or another hydraulic fluid to effect or allow axial movements of a plasticizing screw which is surrounded by a barrel having one or more nozzles for injection of plasticized synthetic plastic material into the cavity or cavities of a mold. The cylinder can receive pressurized hydraulic fluid from one or more motorpump aggregates, and the pressure of fluid in the cylinder is regulated by valves so as to maintain the fluid under a relatively low basic pressure when the screw moves away from the nozzle, to maintain the fluid under a higher injection pressure when the screw begins and continues to move toward the nozzle, and to maintain the fluid at a highest holding pressure not later than when the screw approaches and reaches its front end position at a minimum distance from the nozzle. The screw is rotatable by a suitable motor or transmission so that it can subject freshly admitted granulate to a plasticizing action and simultaneously forces plasticized material into the space between its front end and the nozzle of the barrel in the injection molding apparatus. The barrel receives fresh granulate through the medium of a feed hopper. The length of the rotatable and reciprocable screw is selected in such a way that its front end face is located at a predetermined minimum distance from the nozzle upon completion of each injection molding cycle, i.e., when the screw has completed its axial movement toward the nozzle and has expelled a predetermined quantity of plasticized material through the nozzle and into the cavity or cavities of the mold. The space between the nozzle and the front end face of the screw is then filled with a cushion of plasticized material. The next injection molding cycle is started by admitting fresh granulate into the hopper whereby the granulate enters the barrel and is plasticized by the rotating screw which causes the plasticized material to augment the aforementioned cushion. The material of the cushion cannot escape through the nozzle so that the screw is pushed back and causes the piston which is connected to the ram or piston rod for the screw to move backwards and to expel hydraulic fluid from one chamber of the cylinder. The fluid which fills such chamber is then maintained at the relatively low basic pressure which cannot prevent the screw from moving axially in a direction away from the nozzle at the front end of the barrel. The pressure of hydraulic fluid in the aforementioned chamber of the cylinder is increased to injection pressure when the screw reaches a predetermined rear end position; the screw is then moved forwardly by the ram and piston so that it expels plasticized material from the barrel, and such material penetrates into the cavity or cavities of the mold. Shortly before the screw reaches its front end position, the pressure of hydraulic fluid is raised or lowered to holding pressure, and such pressure is maintained during the last stage of the injection molding cycle.

The making of satisfactory injection molded articles necessitates an extremely accurate control of fluid pressures in the cylinder which controls axial movements of the plasticizing and material injecting screw. Such control includes the magnitude of each of the aforediscussed basic, injection and holding pressures as well as the length of each interval during which the fluid is maintained at a particular pressure. Only such mode of operation insures that the cavity or cavities of the mold are properly filled with material which, when hardened, forms an injection molded article of desirable color, size, shape and strength. The deviations of the weight and/or dimensions of injection molded articles from an optimum weight and/or dimensions are attributable chiefly, or to a large extent, to improper selection of injection pressure and/or to improper selection of the speed at which the screw is caused to move forwardly while the fluid in the cylinder is maintained at injection pressure.

SUMMARY OF THE INVENTION

An object of the invention is to provide a novel and improved injection molding machine, and more particularly an improved apparatus which can control the pressure of fluid in the cylinder which effects or allows axial movements of the plasticizing screw during various stages of an injection molding cycle.

Another object of the invention is to provide a control apparatus which can select and maintain the aforediscussed basic, injection and holding pressures with a high degree of accuracy and reproducibility to thus insure the making of high-quality injection molded articles from synthetic thermoplastic material.

A further object of the invention is to provide a control apparatus of the above outlined character which comprises a relatively small number of relatively simple valves and which can be programmed to determine, with a high degree of accuracy and reproducibility, the duration of each stage of an injection molding cycle.

The invention is embodied in an injection molding machine, preferably a machine of the type comprising an elongated barrel with a nozzle at one end, means (e.g., a hopper) for feeding unplasticized (e.g., granular) synthetic plastic material into the barrel at a locus which is remote from the nozzle, a plasticizing screw in the barrel, (e.g., a motor) means for rotating the screw to thereby plasticize the material which is supplied by the feeding means and to advance plasticized material toward the nozzle whereby the material which accumulates in the barrel behind the nozzle moves the screw away from the nozzle so that the screw moves rearwardly from a first to a second end position, and means for moving the screw from the second to the first end position to thereby expel plasticized material from the barrel by way of the nozzle (into one or more cavities of a mold). The means for moving the screw includes a hydraulic cylinder having a piston connected with the screw (e.g., by means of a ram) and a fluid-containing chamber at that side of the piston which faces away from the screw.

In accordance with the invention, the injection molding machine further comprises a control apparatus for maintaining the hydraulic fluid in the cylinder chamber at a relatively low basic pressure during movement of the screw from the first to the second end position (i.e., while the piston expels fluid from the cylinder chamber), at a higher injection pressure during a first stage of movement of the screw from the second toward the first end position, and at a higher or lower holding pressure during the last stage of movement of the screw toward the first end position. The control apparatus comprises means (e.g., a motor-pump aggregate and a pressure line connected with the outlet of the pump) for supplying fluid at a pressure at least equal to the (highest) holding pressure, a tank or an analogous receptacle for spent fluid, first conduit means which is connected with the cylinder chamber, a first adjustable pressure relief valve having a fluid-admitting first port which is connected with the pressure line and a fluid-discharging second port connected with the first conduit means, a second pressure relief valve having a fluid-admitting first port connected with the first conduit means (and hence with the second port of the first valve) and a fluid-discharging second port connected with the receptacle, a control port provided in each of the pressure relief valves, a pressure-selecting third valve which is operable to set seriatim the second valve for opening at the basic pressure and the first valve for opening at the injection and holding pressures, the third valve having a first port and a fluid-discharging second port connected with the receptacle, second conduit means connected with the two control ports and with the first port of the third valve, means (e.g., a suitable programming unit) for operating the third valve at predetermined intervals, and a fluid flow regulating valve having a first position in which this valve connects the first conduit means with the second conduit means while the second valve is set to open at the basic pressure and a second position in which the regulating valve additionally connects the pressure line with the second conduit means (preferably by way of a flow restrictor) while the first valve is set to open at the injection and holding pressures.

The novel features which are considered as characteristic of the invention are set forth in particular in the appended claims. The improved control apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
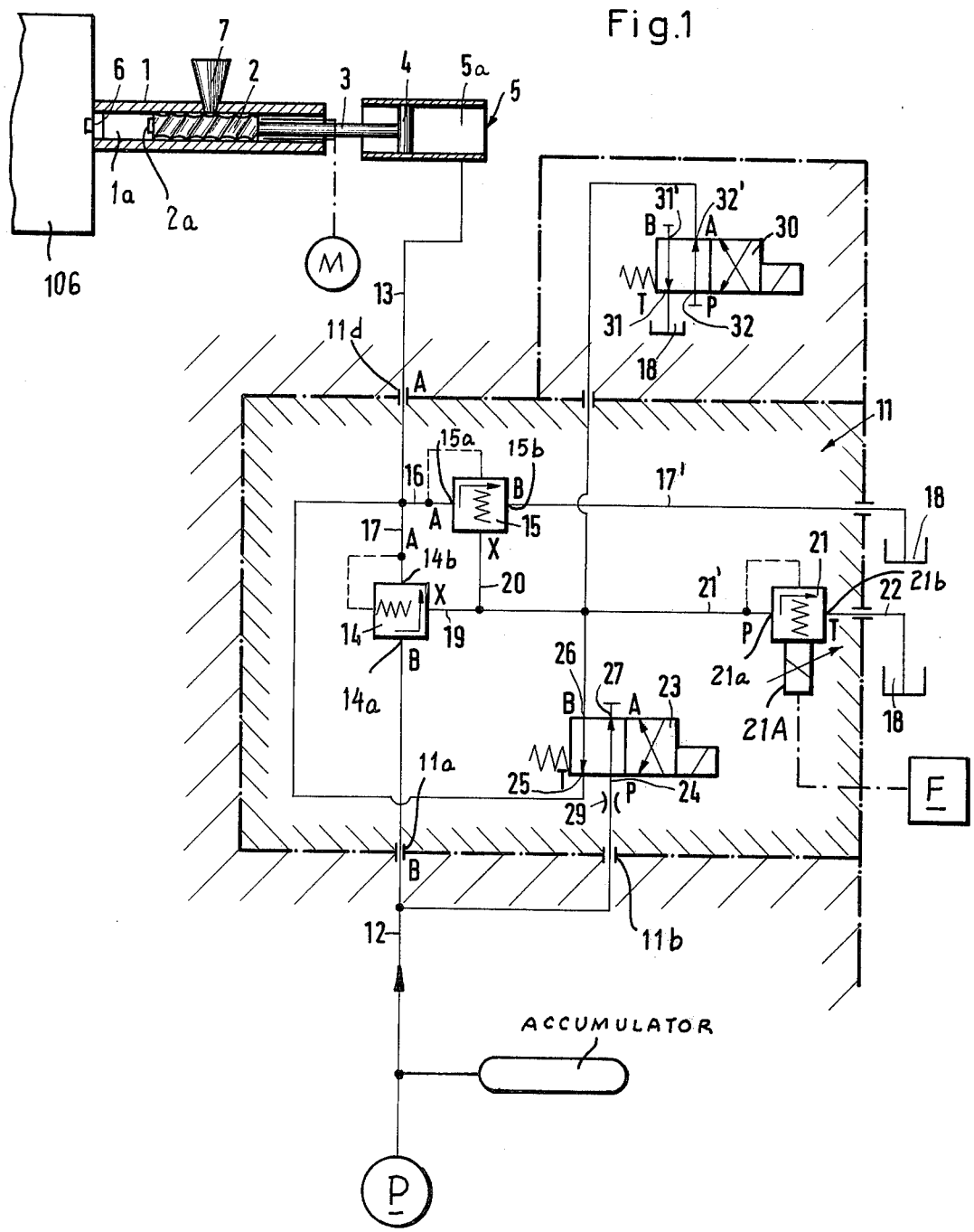
FIG. 1 is a fragmentary sectional view of an injection molding machine and a schematic sectional view of the improved control apparatus; (control scheme)

FIG. 1 shows an injection molding machine which includes an elongated barrel 1 for a rotatable and reciprocable screw 2. The front end portion of the barrel 1 has a nozzle 6 which discharges plasticized material into the cavity or cavities of a suitable mold 106. Granular plastic material is supplied into the barrel 1 by way of a feed hopper 7 which is remote from the nozzle 6. The screw 2 is rotatable by a motor M in a manner not forming part of the invention and is reciprocable by a ram 3 which is connected with a piston 4 in a hydraulic cylinder 5.

Upon completion of an injection molding operation, the frone end face 2a of the screw 2 is located at a predetermined distance from the nozzle 6 and the space 1a in the barrel 1 between the front end face 2a and the nozzle 6 is filled with a cushion consisting of plasticized synthetic plastic material constituting the remnant of that quantity of plasticized material which was confined in the barrel 1 in front of the screw 2 before the latter started to perform a forward stroke.

The screw 2 rotates in the foremost position of FIG. 1 while the hopper 7 feeds granulate into the space between the internal surface of the barrel 1 and the helical peripheral groove of the screw. The granulate is plasticized and is forced to move forwardly due to rotation of the screw 2 so that the aforementioned cushion of plasticized material is augmented by freshly plasticized material which causes the screw 2 to move backwards (i.e., in a direction to the right, as viewed in FIG. 1) so that the piston 4 expels hydraulic fluid from the rear chamber 5a of the cylinder 5. The expelled hydraulic fluid flows through the control apparatus of the invention and is returned into a receptacle or tank 18.

When the screw 2 reaches its rear end position, i.e., when the barrel 1 contains a maximum quantity of plasticized material which fills the space 1a between the nozzle 6 and the front end face 2a, the pressure of hydraulic fluid in the cylinder chamber 5a is raised from a relatively low basic pressure to a higher injection pressure whereby the piston 4 causes the ram 3 to move the screw 2 forwardly so that the front end face 2a expels plasticized material from the space 1a and such material enters the cavity or cavities of the mold 106 by flowing through the orifice or orifices of the nozzle 6.

Shortly before the screw 2 reaches the illustrated front end position, the control apparatus further increases or decreases the pressure of fluid to holding pressure which is maintained while the screw 2 performs the last stage of its movement to the front end position of FIG. 1. The holding pressure is then maintained until the hopper 7 receives a quantity of granulate which is necessary to form a fresh charge of plasticized synthetic plastic material. The manner in which the screw 2 is prevented from moving forwardly beyond the front end position or rearwardly beyond the other end position is known.

The various valves of the control apparatus are mounted in a valve block or housing 11 having two inlet ports 11a, 11b connected with a pressure line 12 which receives pressurized hydraulic fluid from one or more motor-pump aggregates P and constitutes therewith a means for supplying fluid at a pressure not less than the holding pressure. A further port 11d of the block 11 is connected with the rear chamber 5a of the cylinder 5 by a conduit 13 which can convey fluid from the interior of the block 11 into the chamber 5a or in the opposite direction.

The connection between the ports 11a, 11d of the block 11 includes a variable pressure relief valve 14 which determinens the injection and holding pressures of hydraulic fluid (e.g., oil). The relatively low basic pressure of fluid (namely, that pressure under which the fluid filling the chamber 5a is maintained while the rotating screw 2 moves away from the nozzle 6 in response to admission of freshly plasticized material into the space 1a) is determined by a second variable pressure relief valve 15 in the block 11. The fluid-admitting port 15a of the valve 15 is connected with a conduit or bore 16 which communicates with a return conduit 17 and with the aforementioned conduit 13. The conduit 17 returns hydraulic fluid into the tank 18. A fluid-discharging second port 15b of the valve 15 is connected with the tank 18. An adjustable pressure selecting valve 21 in the block 11 has a port 21a which is connected with a conduit or bore 21' communicating with control conduits 19, 20 which are connected to the control ports x of the valves 14, 15. A return conduit 22 connects the fluid-discharging port 21b of the valve 21 with the tank 18. The valve 21 selects the three pressures, namely, the injection pressure, the holding pressure and the basic pressure, and is adjustable by an electromagnet 21A in a manner known per se so as to determine the maximum basic pressure, injection pressure and holding pressure. The electromagnet 21A is controlled by a programming unit F including a signal storing circuit which transmits signals at predetermined intervals to initiate various stages of an injection molding cycle.

The block 11 further includes a 4/2 flow regulating valve 23 and a 4/2 flow regulating valve 30. The port 24 of the valve 23 communicates with the inlet port 11b (and hence with the pressure line 12) by way of a preferably adjustable flow restrictor 29. The port 25 of the valve 23 is connected with the conduits 16, 17 and 13 (first conduit means). The port 27 of the valve 23 is sealed, and the port 26 is connected with the second conduit means including the conduits 19, 20, 21'.

The purpose of the valve 30 is to permit outflow of fluid from the chamber 5a via conduit 13 when the plasticized material penetrating into the space 1a causes the screw 2 to move the piston 4 rearwardly (to the right, as viewed in FIG. 1). The valve 30 has a fluid-discharging port 32 which is sealed from the pump P, a fluid discharging port 31 which communicates with the tank 18, a fluid admitting port 31' which is sealed, and a fluid admitting port 32' which communicates with the second conduit means 19, 20, 21' and with the port 26 of the valve 23.

The adjustable flow restrictor 29 can be replaced by any other suitable fluid flow metering means, such as a valve or an adjustable diaphragm.

FIG. 1 shows the valves in the block 11 in positions they assume when the screw 2 begins to plasticize the granulate supplied by the feed hopper 7. When the plastification of a requisite quantity of granulate is completed, the piston 4 comes to a halt. The flow regulating valve 23 is then actuated so that it allows fluid to flow from the pressure line 12, via flow restrictor 29, ports 24, 26 and to the conduit 19, 20 and 21'. The fluid-admitting port 14a of the pressure relief valve 14 receives a fluid at maximum pressure, i.e., at a pressure corresponding to that in the pressure line 12. The pressure at which the valve 14 is set to open is determined by adjustment of the pressure selecting valve 21 (by programming unit F) so that the conduit 13 receives fluid at injection pressure and the piston 4 pushes the screw 2 toward the orifice 6 whereby the latter admits plasticized material into the cavity or cavities of the mold 106. The pressure of fluid in the chamber 5a is raised to injection pressure with a certain delay. The surplus fluid supplied to the port 14a of the valve 14 is returned to the tank 18 via conduit 21', valve 21 and conduit 22. The valve 21 is adjusted shortly before the piston 4 reaches its front end position, i.e., shortly before the screw 2 expels a requisite quantity of plasticized material from the space 1a into the mold 106. This results in appropriate adjustment of the valve 14 so that the chamber 5a begins to receive fluid at holding pressure. The surplus of fluid delivered to the port 14a continues to flow into the tank 18 via conduits 19, 21', valve 21 and conduit 22. The length of intervals during which the chamber 5a receives fluid at injection pressure and holding pressure is determined by the programming unit F which causes the aforementioned signal storing circuit to transmit to the electromagnet 21A signals at predetermined intervals. When the holding-pressure phase is completed, the programming unit F resets the valve 23 to the position shown in FIG. 1, basic-pressure-phase. During this basic pressure-phase, however, by choice the valve 30 is actuated by means of an electric signal to permit outflow of fluid from the chamber 5a during a certain stage of renewed admission of granulate into the barrel 1, whereby a basic pressure of almost zero is achieved. The valve 21 is set to determine the basic pressure with which the fluid in the chamber 5a opposes (but cannot prevent) the rearward movement of screw 2, ram 3 and piston 4. During such movement of the piston 4, fluid flows from the chamber 5a, through the conduit 13, to the port 15a of the pressure relief valve 15, around the closed valve 14, to the ports 25, 26 of the valve 23, through the control conduits 19, 20 and into the conduit 21'. The valve 15 opens with a short delay so that the fluid which is being expelled from the chamber 5a flows into the tank via valve 21 and conduit 22 as well as via valve 15 and conduit 17'.

In as far as the program "basic-pressure relief" is preselected, the valve 30 is actuated for the purpose of permitting fluid to flow from the chamber 5a to the tank 18 with no resistance at all or with negligible resistance, i.e., the pressure of fluid in the chamber 5a is reduced to atmospheric pressure.

The flow restrictor 29 determines the quantity of fluid which is used to control the operation during the injection and holding pressure stages of a cycle.

An important advantage of the control apparatus is that its component parts offer relatively low resistance to the flow of hydraulic fluid at the desired rate and pressure, that with small control fluid in the conduits relatively large amounts can be controlled in the main control line, e.g., 12 and 13 that the component parts respond to signals with a minimum of delay, and that a single valve 21 can select the basic, injection and holding pressures of the fluid. The inlet 14a of the first pressure relief valve 14 is permanently maintained at maximum fluid pressure (corresponding to that at the outlet of the motor-pump aggregate P). The flow restrictor 29 insures that the quantity of fluid which is used for control of the valves 14, 15 is held to a minimum.

FIG. 2 again is the execution of FIG. 1 and shows a portion of a valve block 211 wherein the two pressure relief valves are fitted as a unitary assembly (cartridge valves). As stated above, the first pressure relief valve (corresponding to the valve 14 of FIG. 1) directly determines the injection and holding pressures whereas the second pressure relief valve (corresponding to the valve 15 of FIG. 1) directly determines the basic pressure of fluid during the respective stages of an injection molding cycle. The valves 21, 23 and 30 are of known design and, therefore, they are not shown in detail in FIG. 2. The valve 30 is represented only by its port 32'.

Figure 2:
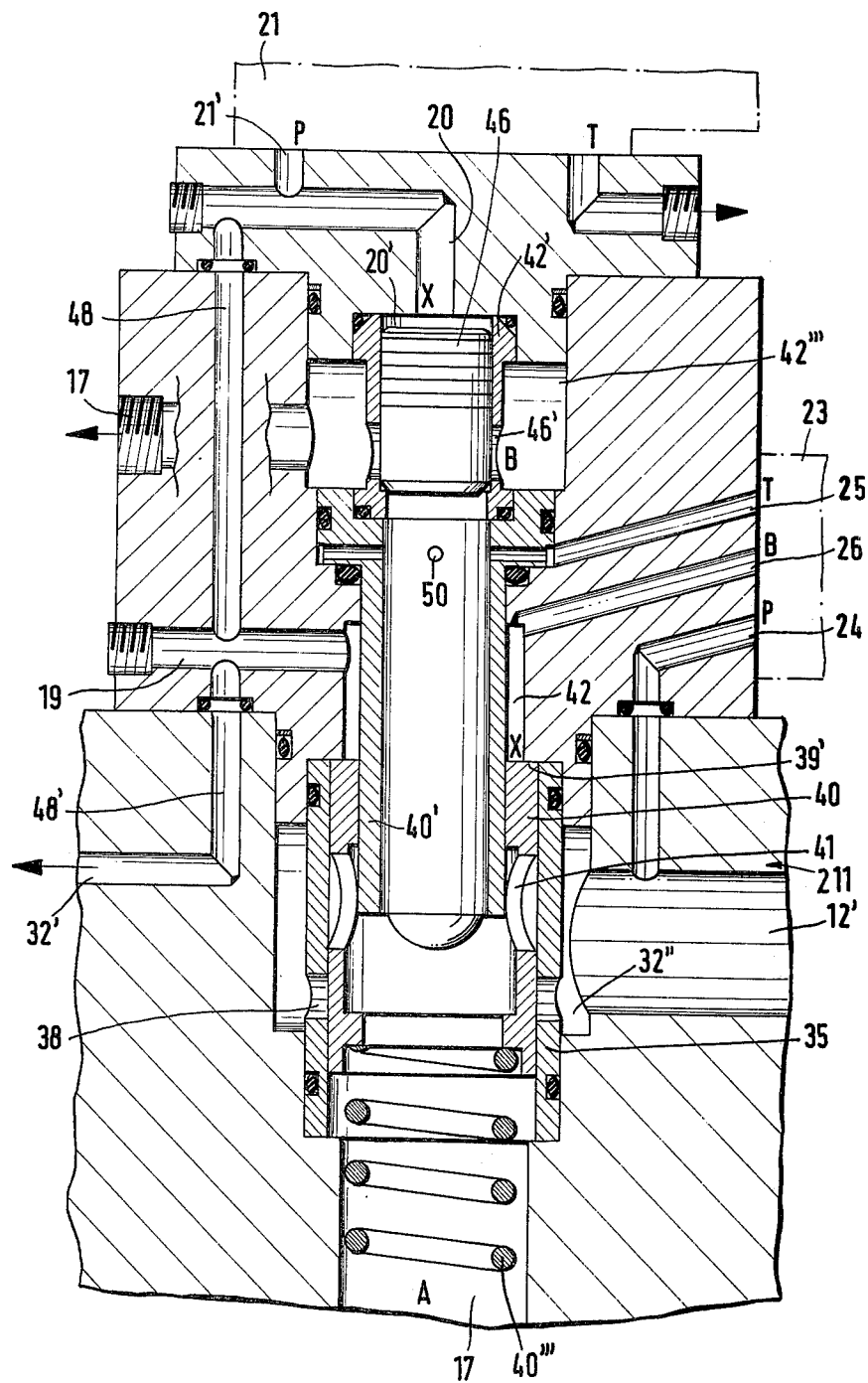
FIG. 2 is an axial sectional view of two pressure relief valves which are interacting as one construction-unit and which is preferably the execution of FIG. 1 of the control apparatus.

The first pressure relief valve of FIG. 2 comprises a first sleeve 35 which is fixedly and sealingly received in and is surrounded by an annular space 32'' of the block 211. The sleeve 35 has one or more radial bores 38 which connect its interior with the space 32''. The bores 38 constitute the fluid-admitting port of the first pressure relief valve (see the port 14a of valve 14 in FIG. 1). The block 211 has a large-diameter bore 12' which extends radially of the sleeve 35 and connects the annular space 32'' with the pressure line 12 (not shown in FIG. 2).

The block 211 further contains a fixedly mounted sleeve 40' which is coaxial with and extends into the upper portion of the sleeve 35, as viewed in FIG. 2, so that the lower portion of the sleeve 40' defines with the surrounding portion of the sleeve 35 a ring-shaped clearance for the upper portion of a further sleeve 40. The sleeve 40 is movable axially in the sleeve 35 and surrounds the sleeve 40'. The large radial bores 41 of the sleeve 40 communicate with the bores 38 when the sleeve 40 leaves the upper end position of FIG. 2.

The median portion of the sleeve 40' is surrounded by a ring-shaped control compartment 42 of the block 211. The lower end of this control compartment is bounded by the respective (upper) end face 39' of the intermediate sleeve 40. The end face 39' is flush with the adjacent end face of the sleeve 35 when the sleeve 40 assumes the illustrated neutral or upper end position. The lower end face of the sleeve 40 abuts against the adjacent end convolution of a helical spring 40''' in the return conduit 17 of the block 211. The spring 40''' reacts against an internal shoulder (not shown) of the block 211. The heretofore described parts in the block 211 constitute the first pressure relief valve corresponding to the valve 14 of FIG. 1. The other or second pressure relief valve (see the valve 15 in FIG. 1) comprises a sleeve 42' which is coaxial with the sleeves 35, 40, 40' and is mounted in the block 211 above the sleeve 40', as viewed in FIG. 2. The sleeve 42' has radial bores 46' which communicate with an annular space 42'''; the latter is in communication with the return conduit 17 of the block 211. The bores 46' constitute the fluid discharging port of the second pressure relief valve.

The sleeves 40', 42' define a composite elongated cylinder chamber for a plunger 46. When the plunger 46 assumes a starting position (shown in FIG. 2), it seals the interior of the sleeve 42' from the annular space 42''' and return conduit 17. The lower end face of the plunger 46 is then located at a level above small-diameter bores or holes 50 machined into the body of the sleeve 40' and communicating with the port 25 of the valve 23. The upper end face of the plunger 46 then extends into a control compartment 20' which is defined by the block 211 and communicates with the control conduit 20.

The bore 12' and annular space 32'' communicate with the port 24 of the valve 23. The compartment 42 communicates with the port 26; this compartment is connected with the control conduit 19 which extends radially of the sleeve 40'. The conduit 19 communicates with the control conduit 20 and conduit 21' by way of a bore or passage 48 in the block 211. The passage 48 is in communication with a bore or passage 48' connected to the port 32' of the valve 30.

An advantage of the unitary assembly including the two pressure relief valves of FIG. 2 is that it can react practically without delay. When the chamber 5a of the cylinder 5 receives fluid at injection pressure or holding pressure, the first pressure relief valve of FIG. 2 cooperates with the valve 23 to form therewith a pressure reducing valve group.

The manner in which the two pressure relief valves of FIG. 2 can be adjusted by the pressure selecting valve 21 will be readily understood by those familiar with the art of such valves. The control port X of the upper pressure relief valve of FIG. 2 communicates with the upper end of the sleeves 42' and the control compartment 42 can be said to constitute the control port X of the lower pressure relief valve. The flow restrictor upstream of the port 24 of valve 23 is not shown in FIG. 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an injection molding machine, a combination comprising an elongated barrel having a nozzle at one end thereof; means for feeding unplasticized synthetic plastic material into said barrel at a locus remote from said nozzle; a plasticizing screw in said barrel; means for rotating said screw to thereby plasticize the material supplied by said feeding means and to advance plasticized material toward said nozzle whereby the material which accumulates in said barrel behind said nozzle moves said screw away from said nozzle from a first to a second end position; means for moving said screw from said second to said first end position to thereby expel plasticized material through said nozzle, including a hydraulic cylinder having a piston connected with said screw and a fluid-containing chamber at that side of said piston which faces away from said screw; and control apparatus for maintaining the fluid in said chamber at a relatively low basic pressure during movement of said screw from said first to said second end position, at a higher injection pressure during a first stage of movement of said screw from said second toward said first end position, and at a higher or lower holding pressure during the remaining stage of movement of said screw to said first end position, comprising means for supplying fluid at a pressure at least equal to said holding pressure, a receptacle for fluid, first conduit means connected with said chamber, a first adjustable pressure relief valve having a fluid-admitting first port connected to said fluid supplying means a fluid-discharging second port connected with said first conduit means, a second pressure relief valve having a fluid-admitting first port connected with said first conduit means and a fluid-discharging second port connected with said receptacle, each of said valves further having a control port, a pressure selecting third valve operable to set seriatim said second valve for opening at said basic pressure and said first valve for opening at said injection and holding pressures, said third valve having a first port and a fluid-discharging second port connected with said receptacle, second conduit means connected with said control ports and with said first port of said third valve, means for operating said third valve, and a fluid flow regulating valve having a first portion in which said regulating valve connects said first conduit means with said second conduit means while said second valve is set to open at said basic pressure and a second position in which said regulating valve additionally connects said fluid supplying means with said first conduit means while said first valve is set to open at said injection and holding pressures.

2. A combination as defined in claim 1, wherein said apparatus further comprises a second fluid flow regulating valve operable to connect said second conduit means with said receptacle while said second valve is set to open at said basic pressure to thereby facilitate the outflow of fluid from said chamber via said first conduit means and said first mentioned regulating valve.

3. A combination as defined in claim 1, wherein said apparatus further comprises flow metering means interposed between said fluid supplying means and said regulating valve to determine the rate of fluid flow from said fluid supplying means to said conduit means in said second position of said regulating valve.

4. A combination as defined in claim 1, wherein said apparatus further comprises a block for said valves, said first pressure relief valve having a first sleeve installed in said block and having at least one first radially extending bore constituting said first port of said first valve, a second sleeve reciprocable in said first sleeve and communicating with said first conduit means, said second sleeve having at least one second radial bore communicating with said first bore while said first valve is open, a third sleeve installed in said block and extending into one end of said second sleeve, and means for biasing said second sleeve in a direction to move said second bore out of register with said first bore, said block having an annular control compartment surrounding said third sleeve, said compartment being adjacent to one end of said second sleeve and communicating with said second conduit means.

5. A combination as defined in claim 4, wherein said second valve comprises a fourth sleeve coaxial with said third sleeve and having at least one radially extending third bore constituting said second port of said second valve, and a plunger reciprocal in said fourth sleeve to a position in which it seals said fourth bore, said plunger having a first end face which is acted upon by fluid in said second conduit means and a second end face, one of said third and fourth sleeves having a hole which communicates with said fluid supplying means and admits fluid from said fluid supplying means against said second end face of said plunger while said first valve is open, said plunger sealing said hole in the closed position of said first valve and said block having a second control compartment adjacent to said first end face of said plunger and communicating with said second conduit means.

6. A combination as defined in claim 1, wherein said means for operating said third valve comprises a programming unit.

7. A combination as defined in claim 1, wherein said fluid flow regulating valve is a 4/2 valve.

8. A combination as defined in claim 1, wherein said fluid supplying means comprises at least one motor-pump aggregate and a pressure-accumulator and a pressure line directly connecting the outlet of the pump of said aggregate with said first port of said first valve.

9. A combination as defined in claim 1, wherein said control apparatus further comprises a valve housing, at least said first and second valves being installed in said housing.

10. A combination as defined in claim 1, wherein said cylinder is coaxial with said barrel and further comprises a ram connecting said piston with said screw.

* * * * *